Patented Feb. 5, 1946

2,394,068

UNITED STATES PATENT OFFICE 2,394,068

DYESTUFFS AND DYESTUFF INTERMEDIATES

John David Kendall and Douglas James Fry, Ilford, England, assignors to Ilford Limited, Ilford, England, a British company No Drawing. Application August 21, 1941, Serial No. 407,841. In Great Britain October 16, 1940.

6 Claims. (Cl. 260—310)

This invention relates to the manufacture of dyestuff intermediates and to the manufacture therefrom of dyestuffs capable of sensitising gelatino-silver halide photographic emulsions.

According to this invention, dyestuff intermediates are produced by reacting a pyrazole-5-one in which the methylene group in the 4-position is unsubstituted, with an ortho ester of a monocarboxylic acid of the formula: $R_1—C(OR_2)_3$ where $R_1$ and $R_2$ are alkyl, aryl or aralkyl groups. The course of the reaction may be indicated as follows:

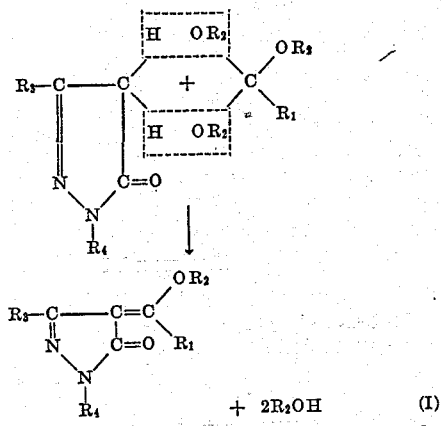

where the groups $R_3$ and $R_4$ are alkyl, aryl, aralkyl or heterocyclic groups.

As examples of pyrazole-5-ones which may be employed there may be mentioned 1-methyl-5-pyrazolone, 1:3-dimethyl-5-pyrazolone,
1-phenyl-5-pyrazolone, 3-phenyl-5-pyrazolone,
1:3-diphenyl-5-pyrazolone, 1-phenyl-3-methyl-5-pyrazolone,
1-phenyl-3-furyl-5-pyrazolone and analogous compounds.

The ortho ester employed may be, for example, an ester of orthoacetic acid, orthopropionic acid or orthobenzoic acid. Preferably ethyl ortho esters are employed but other alkyl ortho esters, or aryl or aralkyl ortho esters may be employed, if desired.

According to a further feature of the invention dyestuffs are produced by condensing a compound of the general Formula I with an alkyl or aralkyl quaternary salt of a heterocyclic nitrogen compound containing an external reactive methyl, mono-substituted methyl or amino group in the α- or γ-position to the heterocyclic nitrogen atom or with a corresponding heterocyclic nitrogen base obtainable by elimination of a hydrogen atom and the acid residue from such quaternary salt.

The course of this reaction may be illustrated as follows:

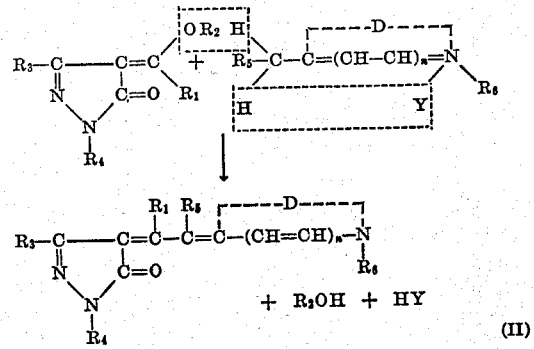

(In the foregoing formulae D is the residue of a heterocyclic nucleus, $R_5$ is a hydrogen atom or an alkyl, aryl or aralkyl group and $R_6$ is an alkyl, or aralkyl group).

Where the corresponding heterocyclic nitrogen base is employed the reaction proceeds similarly but the groupings H and Y are not present and therefore the acid HY is not eliminated.

Where the heterocyclic compound contains a reactive amino group the two hydrogen atoms of such amino group are eliminated as $R_2OH$ and HY, leaving a nitrogen atom instead of the

group of Formula II.

Any of the alkyl and aralkyl quaternary salts of heterocyclic nitrogen compounds commonly employed in the manufacture of cyanine dyestuffs may be employed in the present invention. Examples are the substituted and unsubstituted thiazoles, thiazolines, oxazoles, oxazolines, selenazoles, selenazolines, pyridine, quinoline, indolenine, diazines (e. g. pyrimidine) thio-diazoles and quinazoline and the corresponding substituted or unsubstituted polycyclic compounds such as benzthiazoles, naphthathiazoles and anthrathiazoles and also the diazines described in British specification No. 425,609.

The quaternary salt employed may be, for example, an alkyl or aralkyl chloride, bromide, iodide, sulphate or perchlorate. Preferably, however, the quaternary salt employed is an alkyl or aralkyl-p-toluene sulphonate, e. g. methyl or ethyl p-toluene sulphonate.

As indicated above, the groups $R_1$, $R_2$, $R_3$, $R_4$, $R_5$ and $R_6$ may be alkyl or aralkyl groups; examples are methyl, ethyl, propyl, butyl and higher alkyl groups, benzyl and naphthyl-methyl groups. The groups $R_1$, $R_2$, $R_3$, $R_4$ and $R_5$ may also be aryl groups and examples are phenyl and naphthyl groups. Such aryl groups may themselves be substituted, e. g. by alkyl, amino, hydroxy, alkoxy and oxyalkyl groups and by halogen atoms. Either or both of the groups $R_3$ and $R_4$ may, if desired, be heterocyclic groups, e. g. furyl groups. The group $R_5$ may be a hydrogen atom.

The formation of dyestuffs according to the invention is preferably effected in the presence of an acid binding agent such as pyridine or other mild base, it not being necessary to employ a strong base in order to effect the reaction.

The following examples illustrate the invention:

EXAMPLE I

Preparation of 1-phenyl-3-methyl-4-(methyl-ethoxy-methylene)-5-pyrazolone

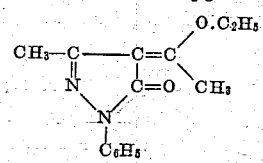

A mixture of 43 gms. of 1-phenyl-3-methyl-5-pyrazolone and 50 gms. of ethyl ortho-acetate was boiled for fifteen minutes, when the mixture solidified. The mixture was then dissolved in 200 ccs. of ethyl alcohol, filtered hot and cooled. A pink-brown solid crystallised out and was separated by filtration. On recrystallisation from petroleum ether, the above compound was obtained as colourless needles melting at 129° C.

EXAMPLE II

Preparation of 1-phenyl-3-methyl-4-(ethyl-ethoxy-methylene)-5-pyrazolone

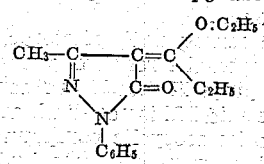

A mixture of 10.1 gms. of ethyl ortho-propionate and 8.6 gms. of 1-phenyl-3-methyl-5-pyrazolone was boiled for fifteen minutes. The mixture was then cooled whereupon the liquid solidified. The solid was then recrystallised from ethyl alcohol, and washed with ethyl alcohol. The product was thus obtained as an almost colourless solid melting at 120° C.

EXAMPLE III

Preparation of 1-phenyl-3-methyl-4-(phenyl-ethoxy-methylene)-5-pyrazolone

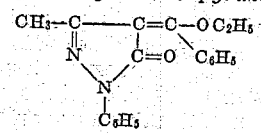

A mixture of 8.6 gms. of 1-phenyl-3-methyl-5-pyrazolone and 11.2 gms. of ethyl ortho-benzoate was boiled for fifteen minutes and then dissolved in ethyl alcohol. The mixture was then cooled and a small quantity of water was added. The product then separated as a yellow solid which after washing with ethyl alcohol had a melting point of 130° C.

EXAMPLE IV

Preparation of α-(2-methyldihydrobenzthiazolylidene)-1.4'-isobutylidene-1'-phenyl-3'-methyl-5'-pyrazolone

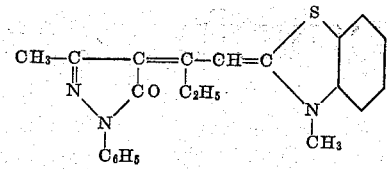

A mixture of 0.93 gms. of methyl-p-toluene sulphonate and 0.75 gms. of 1-methyl-benzthiazole was fused for three hours at 120–130° C. There was then added 1.3 gms. of 1-phenyl-3-methyl-4-(ethyl-ethoxy-methylene)-5-pyrazolone and 20 ccs. of pyridine. The whole mixture was refluxed for half-an-hour and cooled whereupon the dyestuff separated as shining red needles with a blue reflex, having a melting point of 256° C.

EXAMPLE V

Preparation of 2-methyldihydrobenzthiazolylidene-1.4'-isopropylidene-1'-phenyl-3'-methyl-5'-pyrazolone

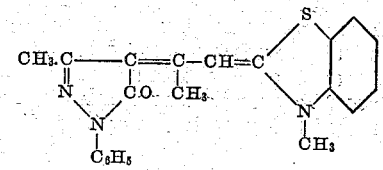

A mixture of 1.49 gms. of 1-methylbenzthiazole and 1.86 gms. of methyl-p-toluene sulphonate was fused for three hours at 130° C. There was then added 2.34 gms. of 1-phenyl-3-methyl-4-(ethoxy-methyl-methylene)-5-pyrazolone and 20 ccs. of pyridine, and the mixture refluxed for 1½ hours. The mixture was then cooled and the precipitated dyestuff separated by filtration. It had a melting point of 248° C.

EXAMPLE VI

Preparation of 2-methyldihydrobenzoxazolylidene-1.4'-isopropylidene-1'-phenyl-3'-methyl-5'-pyrazolone

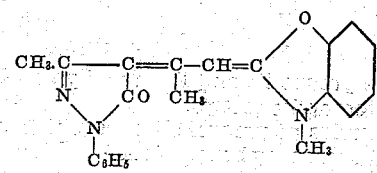

A mixture of 1.33 gms. of 1-methylbenzoxazole and 1.86 gms. of methyl-p-toluene sulphonate was fused for two hours at 130–140° C. There was then added 2.34 gms. of 1-phenyl-3-methyl-4-(ethoxy-methyl-methylene)-5-pyrazolone and 20 ccs. of pyridine and the mixture was refluxed for one hour. The mixture was then diluted with water and cooled and the precipitated dyestuff was separated by filtration. It had a melting range of 180–200° C. with decomposition.

EXAMPLE VII

Preparation of α-(2-methyl-dihydrobenzoxazolylidene-)1.4'-isobutylidene-1'-phenyl-3'-methyl-5'-pyrazolone

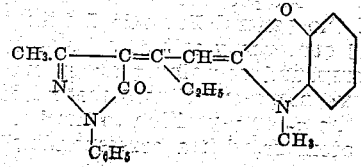

A mixture of 0.65 gms. of 1-methylbenzoxazole and 0.93 gm. of methyl-p-toluene sulphonate was fused for three hours at 120–130° C. There was then added 1.3 gms. of 1-phenyl-3-methyl-4-(ethyl-ethoxy-methylene)-5-pyrazolone and 20 ccs. of pyridine, and the mixture was refluxed for half-an-hour. The mixture was then cooled and diluted with water to a volume of 200 ccs. when the dyestuff separated as a yellow flocculent precipitate. The dyestuff was removed by filtration and had a melting point of 100° C.

EXAMPLE VIII

*Preparation of α-(2-methyl-dihydrobenzthiazolylidene-1)-4'-ethylidene-β-phenyl-β-(1'-phenyl-3'-methyl-5'-pyrazolone)*

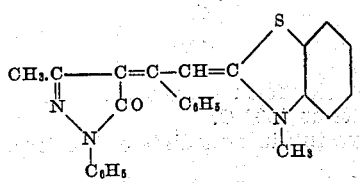

A mixture of 0.75 gms. of 1-methylbenzthiazole and 0.93 gms. of methyl-p-toluene sulphonate was fused for three hours at 130–140° C. There was then added 1.54 gms. of 1-phenyl-3-methyl-4-(phenyl-ethoxy-methylene)-5-pyrazolone and 20 ccs. of pyridine and the mixture was boiled for half-an-hour. The mixture was then diluted with water whereupon the crude dyestuff separated. This was recrystalised from hot ethyl alcohol and thus obtained as light brown needles, melting at 238° C.

EXAMPLE IX

*Preparation of N-(2-methyl-dihydrobenzthiazolyl-1)-α-(1'-phenyl-3'-methyl-5'-pyrazolone-4')-ethylamine*

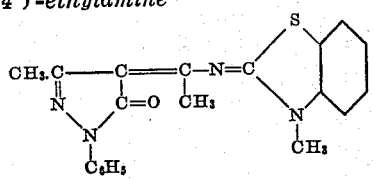

A mixture of 1.5 gms. of 1-aminobenzthiazole and 1.86 gms. of methyl-p-toluene sulphonate was fused for three hours at 130–140° C. There was then added 2.46 gms. of 1-phenyl-3-methyl-4-(methyl-ethoxy-methylene)-5-pyrazolone and 20 ccs. of pyridine. The mixture was then heated on a water bath whereupon the product separated as a yellow precipitate. The mixture was refluxed for fifteen minutes, cooled, and the precipitated dyestuff separated by filtration. After washing with ethyl alcohol and ether the product was obtained as a bright yellow solid, melting at 260° C.

EXAMPLE X

*Preparation of 1-phenyl-3-furyl-4-(methyl-ethoxy-methylene)-5-pyrazolone*

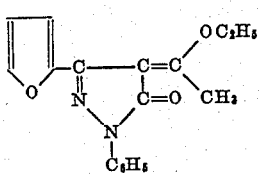

4.5 gms. of phenyl-3-furyl-5-pyrazolone were boiled with 5 gms. of ethyl ortho-acetate for fifteen minutes. The resulting solution was cooled whereupon the desired dyestuff intermediate separated. This was removed by filtration and washed with ethyl alcohol. The product had a melting point of 90–91° C.

EXAMPLE XI

*Preparation of 2-ethyl-dihydrobenzthiazolylidene-1.4'-isopropylidene-1'-phenyl-3'-furyl-5'-pyrazolone*

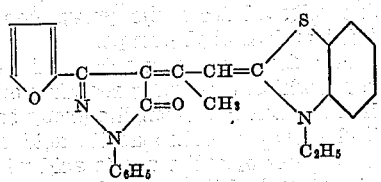

1 gm. of 1-phenyl-3-furyl-4-(methyl-ethoxy-methylene)-5-pyrazolone and 1 gm. of 1-methyl benzthiazole ethiodide were dissolved in 15 ccs. of ethyl alcohol. 0.6 ccs. of triethylamine was added and the solution boiled for two hours. The solution was then cooled and diluted with water, whereupon the desired dyestuff crystallised out. On recrystallisation from methyl alcohol solution it was obtained as red crystals melting at 250° C.

A corresponding dyestuff was obtained by a similar method from the same intermediate using 1 gm. of quinaldine ethiodide instead of the 1-methyl benzthiazole ethiodide. It had a melting point above 185° C.

As already indicated, the dyestuffs produced according to this invention are valuable sensitising dyestuffs for gelatino-silver halide photographic emulsions, e. g. silver chloride, bromide, chlorobromide and iodobromide emulsions. Those dyestuffs in which the group $R_5$ in Formula II is an alkyl or aralkyl group may also be used as intermediates for the production of further dyestuffs as described in our copending application Serial No. 407,838 filed on even date therewith.

What we claim is:

1. Process for the manufacture of dyestuff intermediates which comprises reacting one mol of a compound of the general formula:

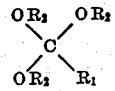

where $R_1$ and $R_2$ are selected from the group consisting of alkyl, aryl and aralkyl groups, with one mol of a compound of the general formula:

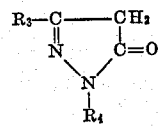

where $R_3$ and $R_4$ are selected from the group consisting of alkyl, aryl and aralkyl groups in the absence of a condensing agent by heating said compounds together so as to form two mols of a monohydric alcohol and a compound of the formula:

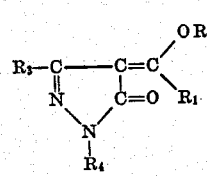

wherein the Rs have the above significance.

2. Dyestuff intermediates which are compounds of the general formula:

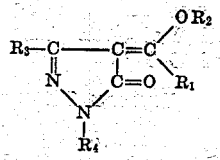

where $R_1$ and $R_2$ are selected from the group consisting of alkyl, aryl and aralkyl groups and $R_3$ and $R_4$ are selected from the group consisting of alkyl, aryl and aralkyl groups.

3. A process for the manufacture of dyestuff intermediates which comprises reacting one mol of an ortho ester selected from the group consisting of alkyl esters of ortho acetic acid and of higher homologues of ortho acetic acid with one mol of a compound of the general formula:

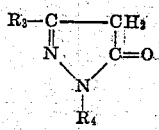

wherein $R_3$ and $R_4$ are selected from the group consisting of alkyl, aryl and aralkyl groups in the absence of a condensing agent by heating said compounds together so as to form two mols of a monohydric alcohol and a compound of the formula:

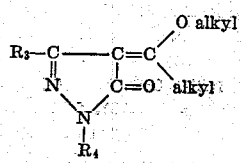

wherein the Rs have the above significance.

4. A dyestuff intermediate of the formula

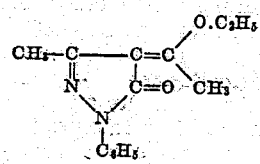

which in the form of colorless needles melts at 129° C.

5. A dyestuff intermediate of the formula

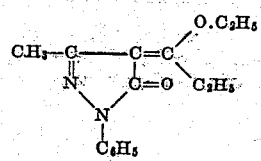

which in the form of a substantially colorless solid melts at 120° C.

6. A dyestuff intermediate of the formula

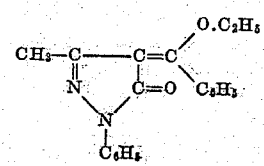

which in the form of a yellow solid melts at 130° C.

JOHN DAVID KENDALL.
DOUGLAS JAMES FRY.